UNITED STATES PATENT OFFICE.

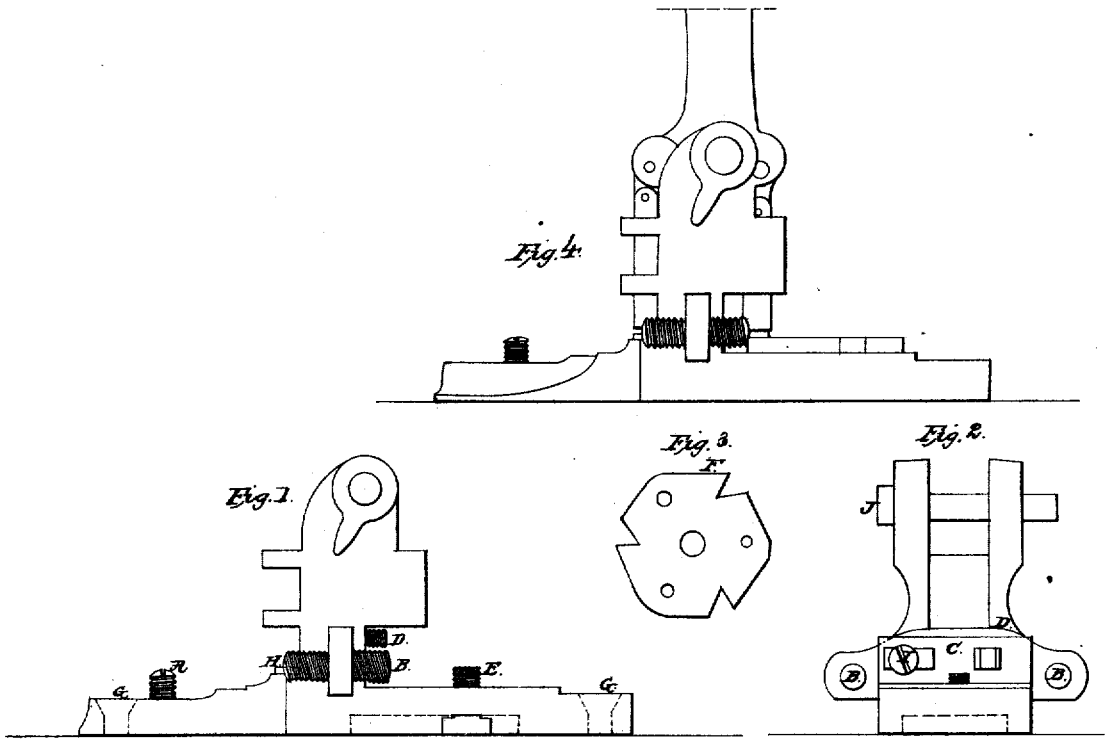
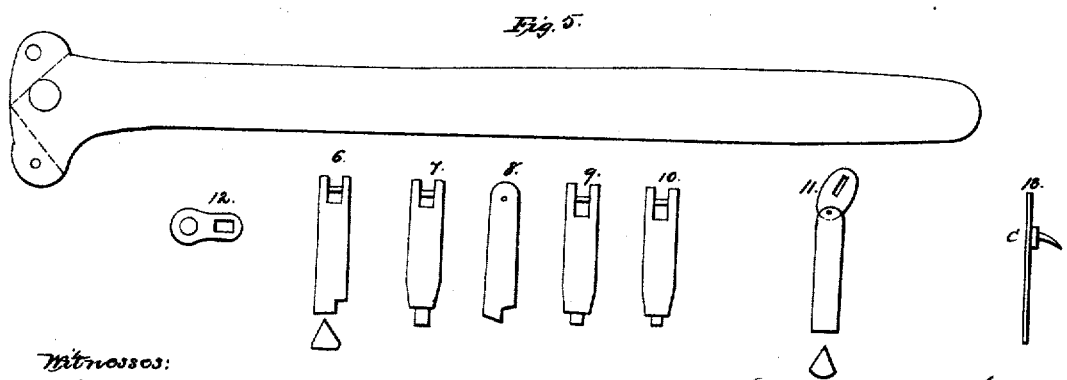

C. G. LOYNES, OF LENOX, MASSACHUSETTS.

MACHINE FOR CUTTING AND SETTING SAW-TEETH.

Specification of Letters Patent No. 22,737, dated January 25, 1859.

*To all whom it may concern:*

Be it known that I, COLUMBIA G. LOYNES, of Lenox, in the county of Berkshire and Commonwealth of Massachusetts, have invented a new and Improved Mode of Cutting and Setting Saw-Teeth; and I do hereby declare that the following is a full and exact description thereof, reference being had to the accompanying drawings and the letters of reference marked thereon.

To enable others skilled in the art to make and use my invention I will proceed to describe its construction and operation.

I construct a bed plate which is fastened to the bench by two screws G, G, shown in No. 1. Upon this bed plate are places for two screws one of which E, is a sliding screw to which the die F is attached. The screw *a* is a screw with which the blade of the saw is raised or lowered so as to give a greater or less set to the saw. The upright part of the bed piece is shown in No. 2. At the sides of its upright part of the bed piece are two (2) screws marked B and B, which are used in guiding the saw blade whether in setting the saw or cutting the teeth and regulates the size of the teeth.

E is a screw attached to the die and which keeps the die in position. The screw is a sliding screw.

F is the die which can be used either for the cutting of the saw teeth shearing the blade, cutting and straightening iron or for punching any metal as the same is used with punches Nos. 6, 7, 8, 9, 10 and 11.

No. 6 is a punch and may be used for cutting teeth or glaziers' tins.

No. 8, are shears operating upon the edge of the die for straightening or cutting iron or any metal.

Nos. 7, 9, 10 are punches of different sizes adapted to different sized holes in the die F.

No. 12 shows the shape of the tongue used for connecting the punches and shears to the lever.

No. 5 is a lever used for operating the machine. H is a piece of steel used for the blade to rest upon in setting the saw. I is a screw by which the guide C is kept in place. J is a bolt or pin upon which the lever No. 5 plays.

No. 1 shows side elevation, No. 2 shows end elevation. No. 4 shows whole machine properly adjusted and in working order.

D is a screw operating upon the back of and intended to control the shape of the teeth.

The machine, relative parts and sides of which are shown in the drawing attached, can be used for any of the purposes specified in connection with the die for cutting teeth, glaziers' tins straightening any metal or for punching by attaching one of the various punches as shown to the tongue at one of the ears of the levers and changing its position of the die to the work wished to be done.

The punch attached to the tongue at the other ear of the lever is used in connection with the steel plate H exclusively as a saw set.

What I claim as my invention and desire to secure by Letters Patent is—

The devices for punching and shearing metals as described arranged in connection with the saw trimmers and saw sets the whole constructed and operating in the manner set forth.

COLUMBIA G. LOYNES.

In presence of—
   LE ROY S. KELLOGG,
   WM. ASHBURNER.